United States Patent
Law et al.

(10) Patent No.: US 11,196,711 B2
(45) Date of Patent: Dec. 7, 2021

(54) FIREWALL FOR ENCRYPTED TRAFFIC IN A PROCESS CONTROL SYSTEM

(71) Applicant: FISHER-ROSEMOUNT SYSTEMS, INC., Round Rock, TX (US)

(72) Inventors: Gary K. Law, Georgetown, TX (US); Godfrey R. Sherriff, Austin, TX (US); Andrew E. Cutchin, Killeen, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 207 days.

(21) Appl. No.: 15/656,002

(22) Filed: Jul. 21, 2017

(65) Prior Publication Data

US 2019/0028437 A1 Jan. 24, 2019

(51) Int. Cl.
| | |
|---|---|
| H04L 29/00 | (2006.01) |
| H04L 29/06 | (2006.01) |
| H04L 29/08 | (2006.01) |
| G05B 19/042 | (2006.01) |

(52) U.S. Cl.
CPC ...... *H04L 63/0254* (2013.01); *G05B 19/0428* (2013.01); *H04L 63/029* (2013.01); *H04L 63/0236* (2013.01); *H04L 63/0245* (2013.01); *H04L 63/10* (2013.01); *H04L 67/025* (2013.01); *H04L 67/12* (2013.01); *H04L 69/22* (2013.01); *G05B 2219/31246* (2013.01); *G05B 2219/35572* (2013.01); *H04L 63/0428* (2013.01)

(58) Field of Classification Search
CPC . H04L 63/0254; H04L 63/10; H04L 63/0428; H04L 63/0236; H04L 63/08; H04L 63/0815
See application file for complete search history.

(56) References Cited

U.S. PATENT DOCUMENTS

| | | | | |
|---|---|---|---|---|
| 7,549,044 B2 * | 6/2009 | Lee | ................... | G06F 21/10 |
| | | | | 380/201 |
| 8,074,278 B2 | 12/2011 | Law et al. | | |
| 10,638,202 B1 * | 4/2020 | Khisti | ............. | H04N 21/64322 |

(Continued)

FOREIGN PATENT DOCUMENTS

| | | |
|---|---|---|
| EP | 2 169 904 A1 | 3/2010 |
| GB | 2 452 850 A | 3/2009 |

OTHER PUBLICATIONS

Search Report for Application No. GB1810444.8, dated Nov. 29, 2018.

*Primary Examiner* — Ellen Tran
*Assistant Examiner* — Helai Salehi
(74) *Attorney, Agent, or Firm* — Marshall, Gerstein & Borun LLP

(57) ABSTRACT

A method for decreasing the risk of unauthorized access to an embedded node in a secure subsystem of a process control system includes receiving a message comprising a message header and a message payload, and determining that the message is an unlock message configured to access one or more protected functions of the embedded node, at least by analyzing a bit sequence of one or more bits in the message header. The method also includes determining whether a manual control mechanism has been placed in a particular state by a human operator, and, based upon those determinations, either causing or not causing the embedded node to enter an unlocked state in which one or more of the protected functions are accessible.

18 Claims, 7 Drawing Sheets

(56) References Cited

U.S. PATENT DOCUMENTS

2015/0347738 A1* 12/2015 Ulrich .................... G06F 21/35
　　　　　　　　　　　　　　　　　　　　　726/17
2017/0085546 A1* 3/2017 Velusamy ............. H04W 12/08

* cited by examiner

FIREWALL FOR ENCRYPTED TRAFFIC IN A PROCESS CONTROL SYSTEM

TECHNICAL FIELD

The present disclosure relates generally to process plants and process control systems, and more particularly, to systems, devices, and methods that protect against network intrusions within process plants and process control systems.

BACKGROUND

Distributed process control systems, like those used in chemical, petroleum or other process plants, typically include one or more process controllers communicatively coupled to one or more field devices via I/O cards or devices, analog, digital or combined analog/digital buses, and/or a wireless communication link or network. The field devices, which may be, for example, valves, valve positioners, actuators, switches and transmitters (e.g., temperature, pressure, level and flow rate sensors), are located within the process environment and generally perform physical or process control functions such as opening or closing valves, measuring process parameters such as pressure, temperature, etc., and the like to control one or more processes executing within the process plant or system. Smart field devices, such as field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices (e.g., via a respective I/O card or device), and execute a controller application that runs, for example, different control modules that make process control decisions, generate control signals based on the received information, and coordinate with the control modules or blocks being performed in the field devices (e.g., HART®, WirelessHART®, and FOUNDATION® Fieldbus field devices). The control modules in the controller send the control signals over the communication lines or links to the field devices to thereby control the operation of at least a portion of the process plant or system. Herein, field devices, I/O cards or devices, controllers, and other related devices may generally be referred to as "process devices" or "process control devices."

Information from the field devices and the controller is usually made available over a communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The communication network utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a communication network to dedicated distributed controllers. Typically, these control modules are made up of communicatively interconnected function blocks, which are objects in an object oriented programming protocol that perform functions within the control scheme based on inputs thereto, and which provide outputs to other function blocks within the control scheme. The configuration application may also allow a configuration designer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the communication network), receive data from the controller application via the communication network and display this data to process control system designers, operators, or other users using the user interfaces, and may provide any of a number of different views, such as an operator's view, an engineer's view, a technician's view, etc. A data historian application is typically stored in and executed by a data historian device that collects and stores some or all of the data provided across the communication network while a configuration database application may run in a still further computer attached to the communication network to store the current process control routine configuration and data associated therewith. Alternatively, the configuration database may be located in the same workstation as the configuration application.

Generally speaking, therefore, a process control system of a process plant includes field devices, controllers, workstations, and other devices that are interconnected by a set of networks and buses. Due to the criticality of many process control devices and functions (e.g., in terms of damage, destruction, and/or loss of plant equipment, product, or even human life), certain functions may be locked to prevent unauthorized access. For example, embedded nodes such as controllers and/or logic solvers in secure subsystems (e.g., in a DeltaV Safety Integrated System™ or SIS™) may be locked to prevent unauthorized downloads, firmware upgrades, access to maintenance/diagnostic functions, decommissioning, and/or other functions. Such protections may be of particular importance where a process control system is connected with various external networks, e.g., for purposes of reducing manufacturing and operational costs, enhancing productivity and efficiencies, providing timely access to process control and/or process plant information, etc. Generally, the interconnection of process plants and/or process control systems to enterprise and/or external networks and systems increases the risk of cyber intrusions and/or malicious cyber-attacks, which may arise from typical or expected vulnerabilities in commercial systems and applications such as those used in enterprise and/or external networks.

In many conventional process control systems, a locked, embedded node can be unlocked if the embedded node receives a special "unlock message." Typically, messages in process control system are structured with both a message header and a message payload, and a given message is recognized as an "unlock" message if (and only if) the message contains a specific, known series of bits at a specific, known position within the message payload. FIG. 1 depicts a conventional unlock message 10 of this sort. As seen in FIG. 1, unlock message 10 includes a conventional message header 12 with various fields, including a source field, a destination field, and an Ethertype field. Unlock message 10 also includes a message payload 14, which includes, inter alia, a bit sequence at a position 16 that is known (e.g., by the embedded node) to correspond to an unlock indicator. If the bits at position 16 have a specific, predetermined value/sequence, message 10 is identified as an unlock message, and the protected functions are unlocked. Thus, in conventional systems, determining whether a particular message is an unlock message requires deep packet inspection (i.e., analysis of the message payload).

To help protect against unauthorized access, including access from certain sources that may have learned the proper unlock message format, firewall devices are typically employed within process control systems, e.g., between operator workstations and secure subsystems. As an additional layer of security, some of these firewall devices, known as "intrusion protection devices" or "IPDs," act as gatekeepers for the unlocking of embedded nodes (i.e., for unlocking certain protected features/functionality of embedded nodes). An IPD typically includes a hardware button that can be physically pushed by an operator. If the IPD receives an unlock message that is destined for an embedded node while the IPD button is pressed, the IPD forwards the unlock message to the embedded node, which makes the locked features/functions available. Conversely, if the IPD receives an unlock message destined for an embedded node while the IPD button is not being pressed, the IPD drops the unlock message, and the locked features/functions of the embedded node remain inaccessible. Thus, unlocking occurs if and only if an unlock message is received while the IPD button is pressed.

In process control systems that only exchange unencrypted traffic, these conventional approaches may be quite effective in preventing network intrusion. However, encryption of data traffic may be necessary or desirable in order to enhance data security within the process control system. Typically, when traffic is encrypted, the entire payload of each message is encrypted, which includes the bits that are used to signify unlock messages. Thus, it is generally not possible to determine whether a particular, encrypted message is an unlock message without first decrypting the message payload. Unfortunately, decrypting the message payload may expose the secure subsystem to harmful network intrusion. Accordingly, there is a need for methods, systems, and devices that can implement, in a secure manner, the protections of an IPD with respect to embedded node unlock messages, even when such messages are encrypted.

SUMMARY

Techniques, systems, apparatuses, components, devices, and methods for decreasing the risk of unauthorized access to an embedded node in a secure subsystem of a process control system are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

In a process control system utilizing (or potentially utilizing) encrypted messages, unlock messages are identified by analyzing an indicator in the message header. In some embodiments, a specific field defined by a particular data packet format/protocol (e.g., the two-byte Ethertype field of a conventional Ethernet frame) may be repurposed, at least in part, for use as an unlock message indicator. Unlock messages may be indicated using a predefined bit sequence that is known to an intrusion protection device (IPD). The IPD may learn the sequence (or set of multiple possible sequences) corresponding to unlock messages, and/or learn the position of the sequence (e.g., within the Ethertype field) by virtue of having downloaded specialized software or firmware, for example.

Encrypted messages typically encrypt the payload, but not the header. Thus, by inspecting the message headers, the IPD may identify unlock messages without performing the decryption necessary for deep packet inspection. More generally, the firewall techniques of the IPD may avoid deep packet inspection by being based solely on header information, such as source, destination, and type, rather than any payload information.

Accordingly, any embedded node and/or secure subsystem protected by the IPD may be far less susceptible to intrusion. Apart from the new techniques described herein for identifying unlock messages, the unlocking of an embedded node may proceed in a manner similar to conventional IPDs. For example, the IPD may discard or drop each and every unlock message that is identified as such (based on the unlock indicator bit sequence) unless that unlock message is received while a physical control (e.g., a button) on the IPD is activated (e.g., pressed) by an operator.

DETAILED DESCRIPTION

Figure 2:
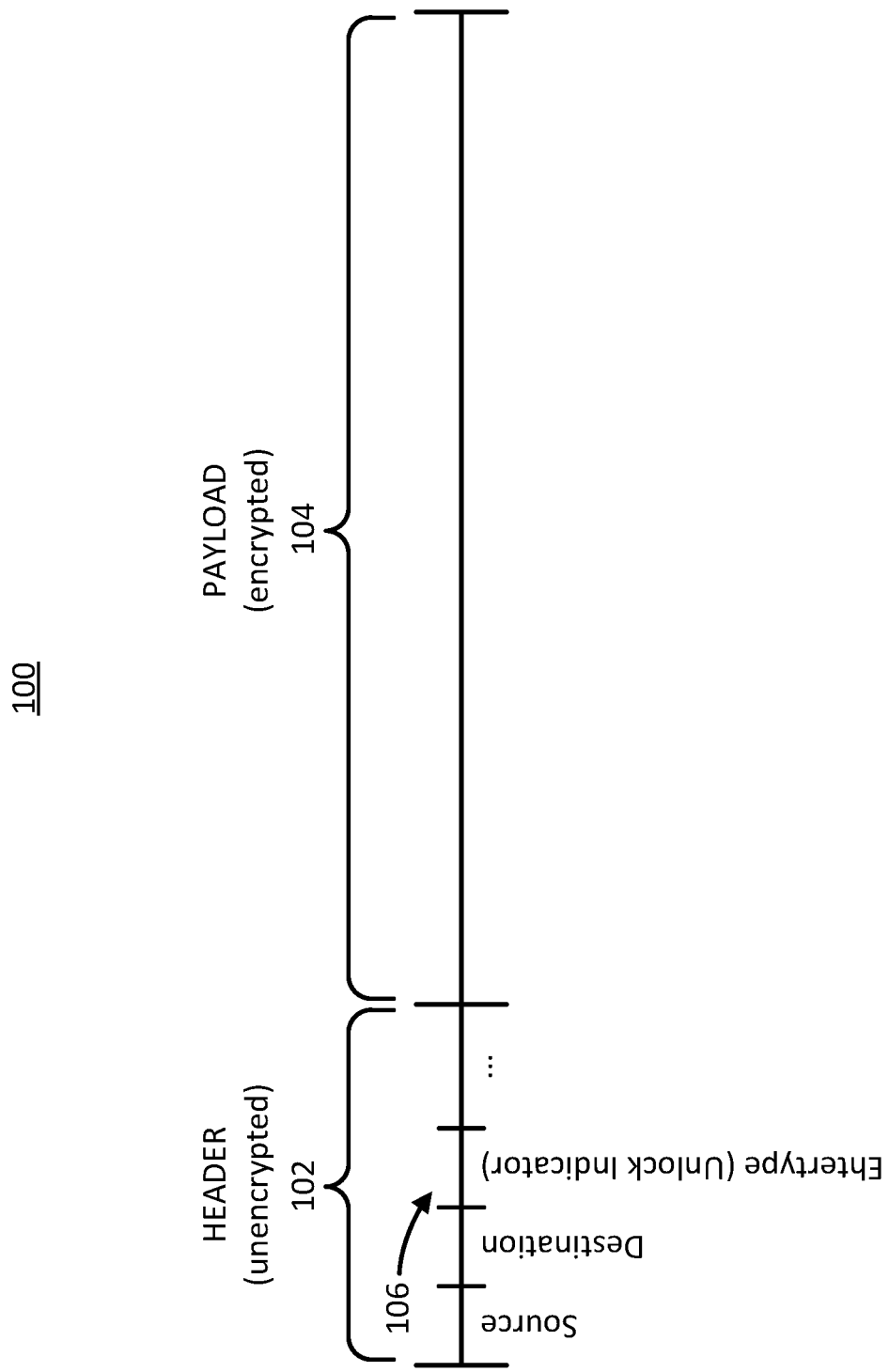
FIG. 2 depicts a new, exemplary unlock message that may be used to unlock protected functions in a process control system.

FIG. 2 depicts an exemplary unlock message 100 that may be used to unlock one or more protected functions in a process control system, according to one embodiment. The protected functions may include functions provided by, or otherwise associated with, one or more embedded nodes (e.g., controller(s), logic solver(s), etc.) in a secure subsystem of the process control system (e.g., in a DeltaV Safety Integrated System, or SIS). The protected function(s) may include a diagnostic function, an upgrade function, a decommissioning function, and/or one or more other function for which controlled/limited access is desired.

As seen in FIG. 2, the unlock message 100 includes a message header 102, which is unencrypted, and a message payload 104, which is encrypted. Message payload 104 may have been encrypted by the source of unlock message 100 (or an intermediary device) using any suitable encryption technology, and may be any length subject to limitations of the protocol or standard with which unlock message 100 generally complies (e.g., a specific IEEE standard). In the example embodiment of FIG. 1, message header 102 includes a source field (defined by the protocol as a MAC address of the source of unlock message 100), a destination field (defined by the protocol as a MAC address of the intended destination for unlock message 100), an Ethertype field (defined by the protocol as an indication of which protocol is encapsulated within message payload 104, such as IPv4, ARP, Wake-on-LAN, TRILL, etc., and possibly also the size of message payload 104 and/or unlock message 100), and one or more other fields (e.g., a preamble, a delimiter, etc.), which may also comply with the same protocol/standard.

At a position 106 within message header 102, a sequence of one or more bits indicates that message 100 is an unlock message. In some embodiments, a single, predefined bit sequence is used to unlock all locked functions of an embedded node, while in other embodiments, different bit sequences are needed to unlock different embedded node functions. In the embodiment of FIG. 2, position 106 of the bit sequence coincides precisely with the standard/protocol-defined position of the Ethertype field of message header 102. In some embodiments, the Ethertype field is a two-byte field. In such an embodiment, for example, the exact bit sequence "1010 1010 1010 1010" may indicate that message 100 is an unlock message. In other embodiments, however, the bit sequence indicating an unlock message does not occupy all bits of a particular field. If position 106 coincides with a two-byte Ethertype field, for example, any bit sequence of "1xxxxxxx xxxxxxxx" may indicate an unlock message, where "x" represents a "don't care" bit that can be of either value (0 or 1). Thus, bits at position 106 may, in some embodiments, provide an unlock indicator while also providing other information (e.g., information about the type of protocol encapsulated in message payload 104). Moreover, in some embodiments, the Ethertype (or other header) field may also be used to indicate other types of messages, other than unlock messages.

In alternative embodiments, the unlock indicator (bit sequence) may be at a different position within header 102, other than the position that is normally associated with the Ethertype field. Moreover, in some embodiments, message header 102 may include more, fewer, and/or different fields than those shown in FIG. 2. More generally, unlock message 100 as a whole may be arranged differently than shown in FIG. 1. For example, unlock message 100 may include a footer, after message payload 104, that contains a cyclic redundancy check (CRC) field and/or one or more other fields.

Because position 106 of the unlock indicator is in message header 102 rather than message payload 104, it is possible to identify an unlock message without first decrypting the encrypted message payload 104. Thus, unlike the prior art unlock message 10 of FIG. 1 (which would require decrypting payload 14, if unlock message 10 were encrypted), it is possible to identify unlock messages without performing decryption, and without increasing the risk of network intrusion. Moreover, in some embodiments, if an IPD button or other manual control is not activated when unlock message 100 is received, unlock message 100 can properly be discarded without ever having decrypted any portion of unlock message 100.

Figure 3:
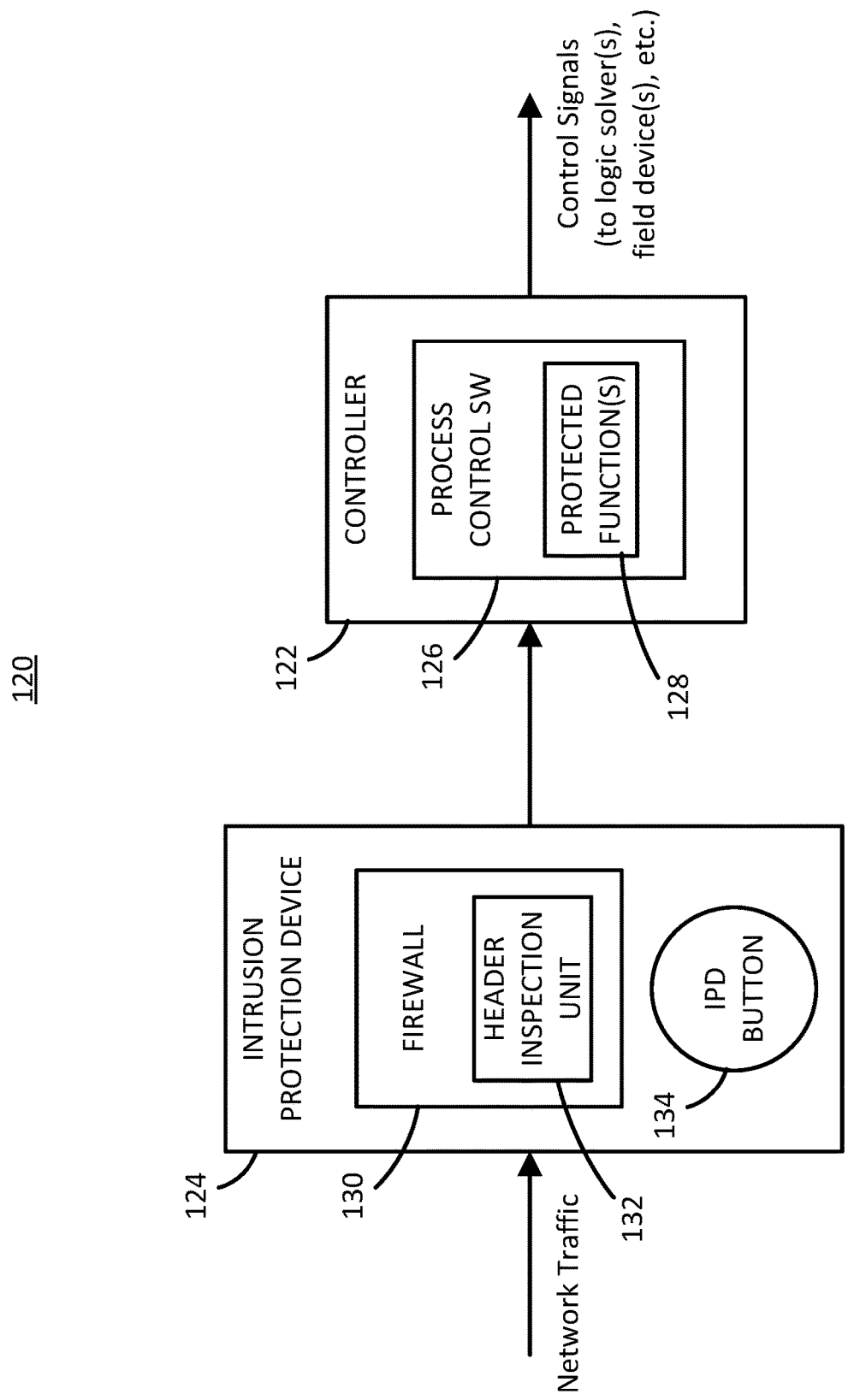
FIG. 3 is a block diagram of an exemplary secure subsystem utilizing an unlock message, such as the unlock message of FIG. 2.

As noted above, unlock message 100 may be used to unlock one or more protected functions of an embedded node in a secure subsystem. An example of one such secure subsystem 120 is shown in FIG. 3. Secure subsystem 120 may be a DeltaV SIS, or a part thereof, for example. As seen in FIG. 3, secure subsystem 120 includes a controller 122, which is an embedded node of secure subsystem 120, and an intrusion protection device (IPD) 124, which operates as a firewall device to prevent unauthorized access to controller 122 (and possibly to other parts of secure subsystem 120 not shown in FIG. 3). While depicted in FIG. 3 as a part of secure subsystem 120, it is understood that IPD 124 may instead be viewed as external to secure subsystem 120 (e.g., as a gateway to secure subsystem 120).

Controller 122 includes process control software 126 (possibly including firmware and/or hardware), which implements one or more configurable control routines/modules (or portions thereof) within the process control system. For example, process control software 126 may include instructions that cause controller 122 to implement a particular control routine by receiving signals indicative of process measurements made by one or more field devices, analyzing those signals to generate control signals, and sending those control signals to one or more other field devices. Process control software 126 may be downloaded from a configuration workstation (e.g., as discussed below in connection with FIG. 5) and stored as instructions in a persistent memory of controller 122 (not shown in FIG. 3), such as a hard drive or solid state memory, for example. In an alternative embodiment, controller 122 is instead a different type of embedded node, such as a logic solver, for example.

Process control software 126 may support one or more protected/locked functions 128, which may or may not include functions directly associated with any control routines implemented by process control software 126. For example, protected function(s) 128 may include a function for interrupting a control routine currently being executed by controller 122, a function for injecting an input to a control routine currently being executed by controller 122, a function for downloading a new control routine to controller 122, a function for placing controller 122 in a diagnostic mode, and so on. Process control software 126 is also configured to determine when a received message is an unlock message, and to permit access to protected function(s) 128 when a valid unlock message is received, as discussed further below.

IPD 124 includes a persistent memory (e.g., a hard drive or solid state memory, not shown in FIG. 3) storing instructions of a firewall 130. Firewall 130 includes software, firmware, and/or hardware that is generally configured to apply various security monitoring and/or control functions to the network traffic received by IPD 124 based on various security rules. Firewall 130 may include software configured to detect and quarantine computer viruses, for example.

Firewall 130 also includes a header inspection unit 132, which identifies valid unlock messages among messages/packets received by IPD 124. In particular, header inspection unit 132 examines the bit sequence at a specific position within an unencrypted message header (e.g., position 106 within message header 102 of FIG. 2), and determines whether the bit sequence indicates that the message is an unlock message. For example, header inspection unit 132 may compare the bit sequence at that position to a specific bit sequence, or a specific set of bit sequences, that is/are known to correspond to unlock messages.

If header inspection unit 132 determines that a given message is an unlock message, firewall 130 examines the current state of an IPD button 134, which generally (or always, in some embodiments) must be activated/pressed in order for an unlock message to unlock any of protected function(s) 128. IPD button 134 may be a physical button exposed on a surface (or under a removable cover, etc.) of IPD 124. In other embodiments, IPD button 134 is a different type of manual control, such as a toggle switch that is activated by turning the switch "on," or a set of buttons, discs, dials, switches, etc., that is activated by setting each of the individual buttons/dials/switches/etc. according to a specific combination/code, etc.

If firewall 130 determines that IPD button 134 is currently being activated (e.g., pressed), IPD 124 may forward the unlock message to controller 122. Controller 122 may then examine the bit sequence at the appropriate position of the message header to recognize the message as an unlock message, and provide access to protected function(s) 128 as needed. If firewall 130 instead determines that IPD button 134 is not currently activated, IPD 124 may discard the unlock message, and never forward the unlock message to controller 122.

Figure 1:
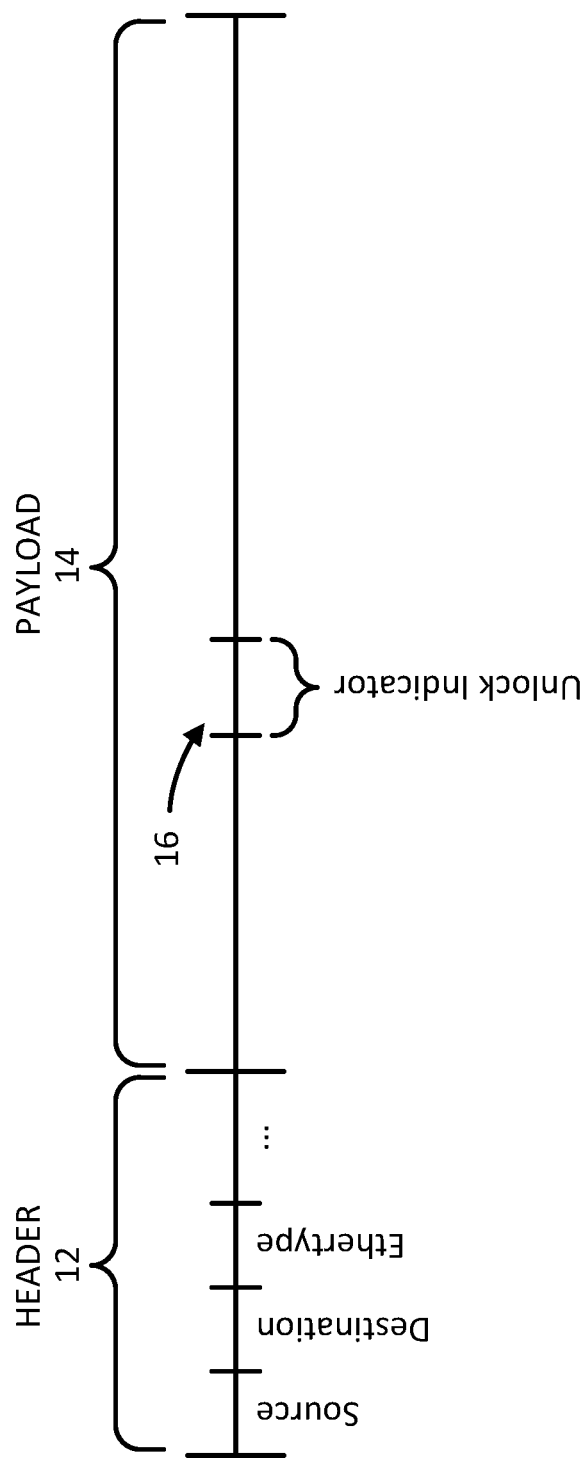
FIG. 1 depicts a prior art unlock message used to unlock protected functions in a conventional process control system.

In other embodiments, unlock messages also include a second unlock indicator within the message payload (e.g., at a conventional position for such an indicator, as indicated in FIG. 1), and controller 122 identifies the message as an unlock message by analyzing the second unlock indicator (i.e., after decryption). Even in this latter embodiment, however, IPD 124 still discards unauthorized unlock messages corresponding to times when IPD button 134 is not activated. Thus, controller 122 still does not need to decrypt most or all unauthorized unlock messages.

In alternative embodiments, firewall 130 does not require that IPD button 134 be currently activated in order to forward an unlock message to controller 122. For example, it may be sufficient for IPD button 134 to have been pressed or otherwise activated at some time in the last five seconds, etc.

In some embodiments where the unlock indicator is in the position of the Ethertype field (e.g., position 106 in FIG. 2), controller 122 is configured to disregard the Ethertype field (e.g., if controller 122 identifies unlock messages by analyzing the header, in the same manner as IPD 124), or to analyze the Ethertype field in a non-conventional manner (e.g., if the unlock indicator is combined with an Ethertype indicator, as discussed above in connection with FIG. 2). In other embodiments (e.g., some embodiments where controller 122 identifies unlock messages in a conventional manner by analyzing the message payload), after IPD 124 analyzes the unlock indicator in the Ethertype field, IPD 124 modifies the Ethertype field to a standardized value that is recognizable by controller 122.

Figure 4:
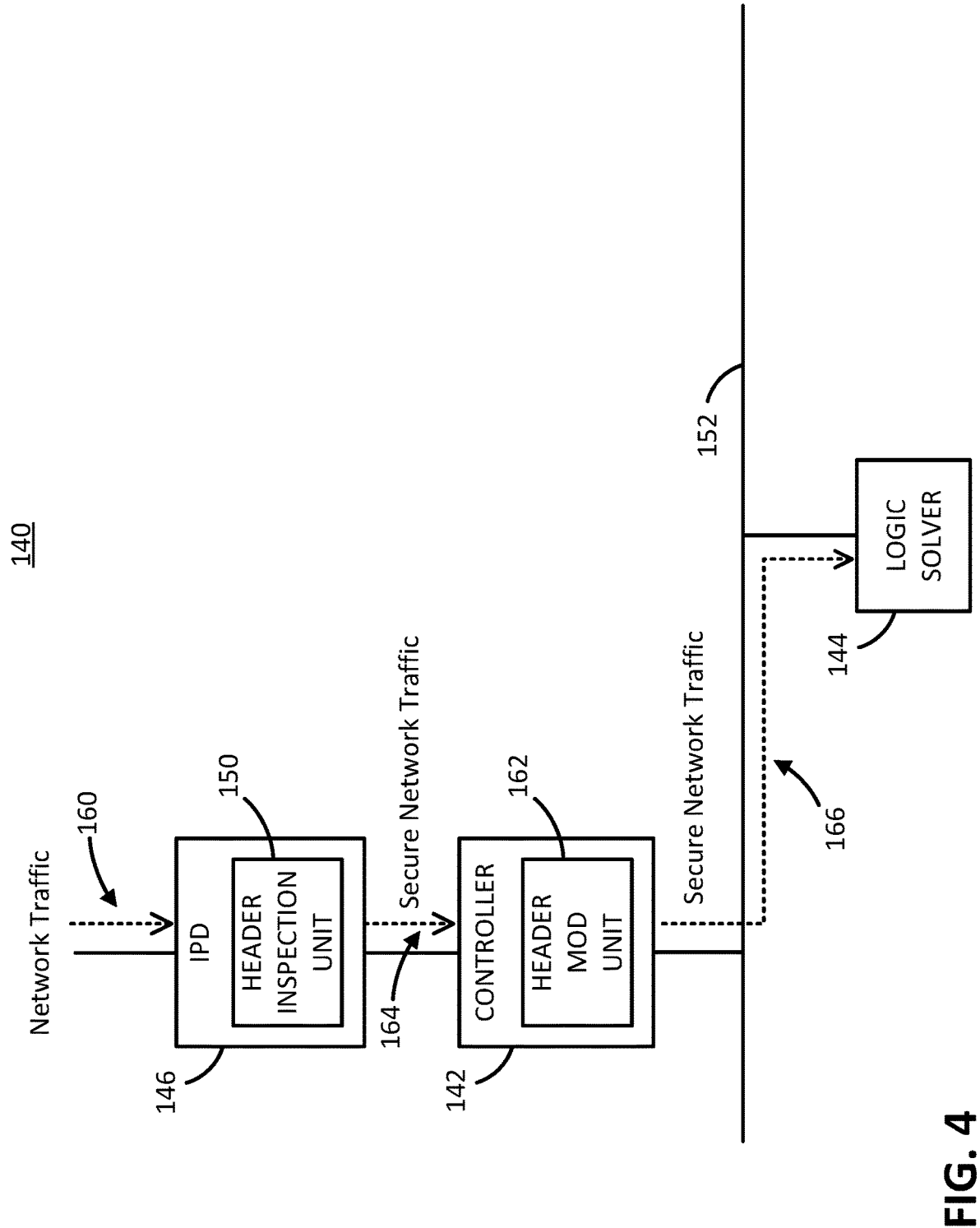
FIG. 4 is a block diagram of another exemplary secure subsystem utilizing an unlock message, such as the unlock message of FIG. 2.

Another secure subsystem 140 that may utilize unlock message 100 of FIG. 2 is shown in FIG. 4. As seen in FIG. 4, secure subsystem 140 (e.g., a DeltaV SIS, or a portion thereof) includes two embedded nodes: a controller 142 and a logic solver 144. Controller 142 may be similar to controller 122 of FIG. 3, for example. As its name suggests, logic solver 144 may generally be configured to perform logic solving within the process control system. For example, a number of logic solvers similar to logic solver 144 may be used to perform modular, scalable logic solving tasks needed to execute a number of control routines executed by controller 142.

Controller 142 and logic solver 144 may each perform, or otherwise be associated with, one or more protected functions. The protected functions may be similar to those described above in connection with FIG. 3 (e.g., functions that affect a live control routine, update functions, diagnostic functions, etc.). Controller 142 and logic solver 144 may include persistent memories that store instructions supporting these and other functions.

An IPD 146 operates as a firewall device to prevent unauthorized access to controller 142, logic solver 144, and possibly to other parts of secure subsystem 140 not shown in FIG. 4. IPD 146 may be similar to IPD 124 of FIG. 3, for example, and includes a header inspection unit 150 which may be similar to header inspection unit 132 of FIG. 3. While depicted in FIG. 4 as a part of secure subsystem 140, it is understood that IPD 146 may instead be viewed as external to secure subsystem 140 (e.g., as a gateway to secure subsystem 140).

A process control network or backbone 152, which may be wired and/or wireless, couples controller 142 to logic solver 144, and possibly also to a number of other devices (e.g., other logic solvers, I/O cards, etc.). Logic solver 144 may be coupled, via one or more wired and/or wireless networks, to a number of field devices of secure subsystem 140 (not depicted in FIG. 4).

In some embodiments, access to protected functions of controller 142 operates in the manner discussed above in connection with FIG. 3. For example, header inspection unit 150 may examine each message header, in network traffic 160 (which may or may not be encrypted), to determine whether a particular message destined for controller 142 is an unlock message, and may also detect whether an IPD button or other manual control is currently activated. If the manual control is activated (or, in some embodiments, has been recently activated), IPD 146 forwards unlock messages to controller 142, which analyzes the same header field (or a second unlock indicator within the message payload, after decryption) to identify unlock messages and allow access to (e.g., to execute) protected functions.

In some embodiments, access to protected functions of logic solver 144 operates in a similar manner. In other embodiments, however, controller 142 is configured to recognize (or at least, not discard) messages/packets with altered header (e.g., Ethertype) fields, while logic solver 144 is not and therefore discards such messages. In these latter embodiments, controller 142 may include a header modification unit 162 (e.g., stored as instructions in a persistent memory of controller 142), as depicted in FIG. 4. Header modification unit 162 is generally configured to change the Ethertype or other header field that was used to indicate unlock messages back to an appropriate/recognized value (e.g., as defined by a standard/protocol).

For example, if network traffic 160 includes an unlock message similar to unlock message 100 of FIG. 2, header inspection unit 150 may analyze the bit sequence at position 106 of message header 102 to identify the message as an unlock message. If the IPD button or other manual control is activated at the appropriate time, IPD 146 forwards the unlock message to controller 142 within secure network traffic 164. Controller 142 may recognize the message as an unlock message destined for logic solver 144 in various ways. For example, IPD 146 may send accompanying data to controller 142 that indicates as much, or controller 142 may determine this by examining the unlock indicator (in the header, or a second, decrypted unlock indicator in the payload) and the destination MAC address.

Header modification unit 162 of controller 142 then changes the unlock indicator in the message header to a value that is pre-defined by an applicable standard or protocol (e.g., to a conventional Ethertype value), and forwards the unlock message to logic solver 144 within secure network traffic 166 via backbone 152. Logic solver 144 may then interpret the value in the Ethertype field (or other header field) in a conventional manner, and recognize the message as an unlock message either by analyzing an unlock indicator in the decrypted payload (e.g., an indicator that was originally present in the message in network traffic 166, or a new indicator that was added by IPD 146 or controller 142). Logic solver 144 may then allow access to (e.g., execute) the protected function(s). In some alternative embodiments, header modification unit 162 is located within IPD 146 rather than controller 142, or in another intermediary device not shown in FIG. 4.

Figure 5:
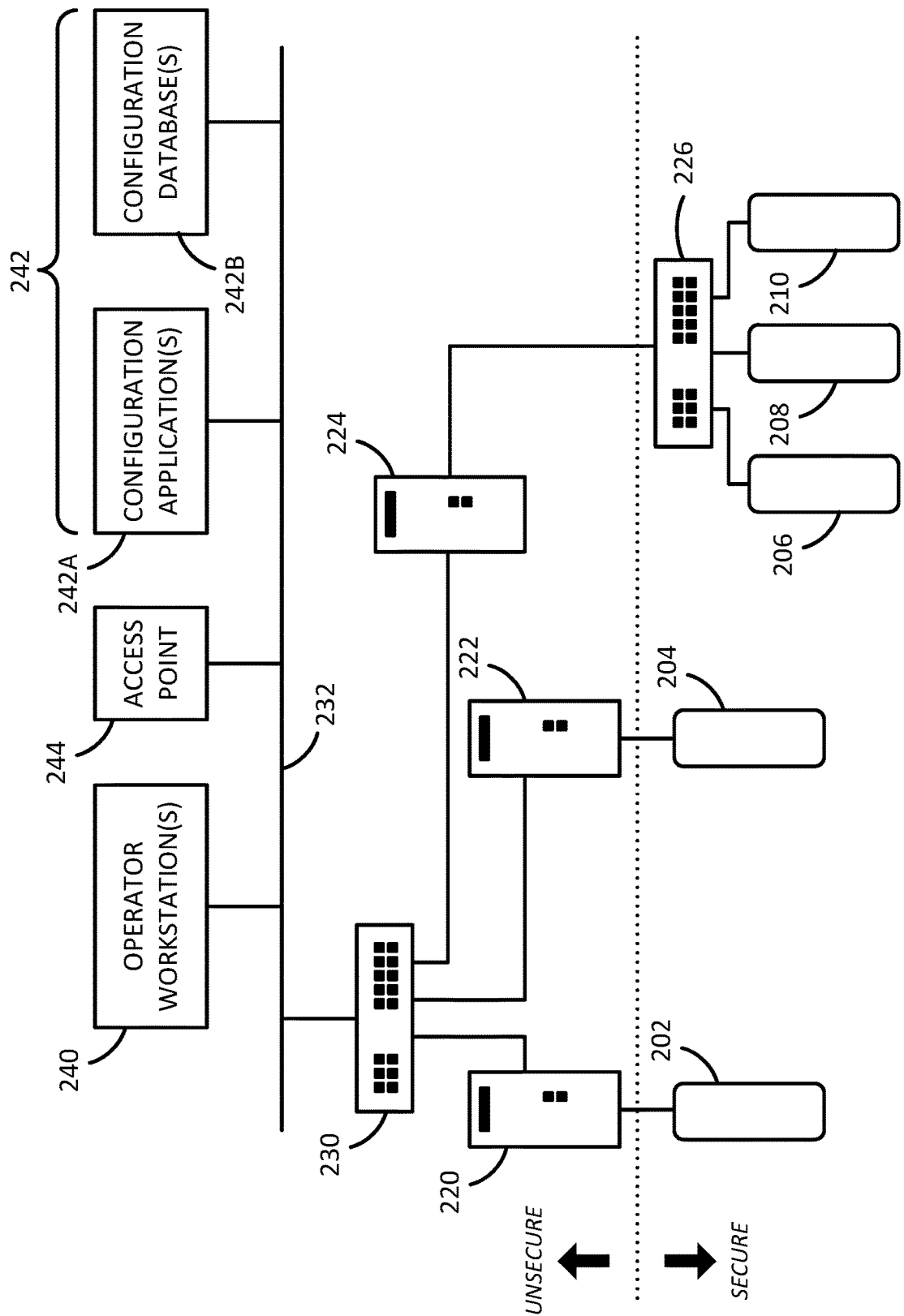
FIG. 5 is a block diagram of an exemplary process control environment utilizing an unlock message, such as the unlock message of FIG. 2, and/or incorporating one or more secure subsystems, such as the secure subsystem of FIGS. 3 and/or 4.

FIG. 5 is a block diagram of an exemplary process control environment 200, which may utilize an unlock message such as unlock message 100 of FIG. 2, and/or incorporate one or more secure subsystems such as secure subsystem 120 of FIGS. 3 and/or secure subsystem 140 of FIG. 4. In the example environment 200, the area above the dotted line may be (relatively) unsecured, while the area below the dotted line may represent secure subsystems (e.g., DeltaV SISs).

Process control environment 200 includes a number of controllers 202, 204, 206, 208, 210 (referred to collectively herein as "controllers 202-210") that receive signals indicative of process measurements made by field devices (not shown in FIG. 5), process this information to implement a control routine, and generate control signals that are sent over wired and/or wireless process control communication links or networks to other field devices (also not shown in FIG. 5) to control the operation of a process in process control environment 200. Typically, at least one field device performs a physical function (e.g., opening or closing a valve, increasing or decreasing a temperature, taking a measurement, sensing a condition, etc.) to control the operation of a process. Some types of field devices communicate with controllers 202, 204, 206, 208, and/or 210 by using I/O devices. Process controllers 202-210, field devices, and I/O devices may be wired or wireless, and any number and combination of wired and wireless process controllers, field devices, and I/O devices may be included in process control environment 200.

In the example environment 200, controller 202 is communicatively connected to an IPD 220, controller 204 is communicatively connected to an IPD 222, and controllers 206, 208, 210 are communicatively connected to an IPD 224 via a switch device 226. Each of controllers 202-210 may also be communicatively coupled (directly, and/or via I/O cards) to one or more field devices and/or other associated nodes (e.g., logic solvers), which as noted above are not shown in FIG. 5 for clarity. The field devices (e.g., sensors, valves, motors, transmitters, positioners, etc.) may be any wired and/or wireless devices that use any suitable smart communication protocol, such as the FOUNDATION® Fieldbus protocol, the HART® protocol, the WirelessHART® protocol, etc.

Each of controllers 202-210 (which, by way of example, may be DeltaV controllers sold by Emerson Process Management) includes a processor, and a memory storing instructions for one or more process control routines that are discussed in further detail below. IPDs 220, 222, 224 are also communicatively connected to a switch device 230, which is in turn communicatively connected to a process control communication network or backbone 232. The backbone 232 may include one or more wired and/or wireless communication links, and may be implemented using any suitable communication protocol such as, for example, an Ethernet protocol. Each of switch devices 226 and 230 may route messages along the appropriate path based on the designated recipient (e.g., destination MAC address).

It should be noted that any control routines or modules described herein may have parts thereof implemented or executed by different controllers or other devices if so desired. Likewise, the control modules to be implemented within process control environment 100 may take any form, including software, firmware, hardware, etc. Control routines may be implemented in any desired software format, such as using object oriented programming, ladder logic, sequential function charts, function block diagrams, or using any other software programming language or design paradigm. Each of the memories on which control routines or modules are stored may be any suitable type of memory, such as random access memory (RAM) and/or read only memory (ROM). Moreover, the control routines or modules may be hard-coded into, for example, one or more EPROMs, EEPROMs, application specific integrated circuits (ASICs), and/or any other hardware or firmware elements. Thus, each of controllers 202-210 may be configured in any desired manner to implement a control strategy or control routine/module.

Each of controllers 202-210 implements a control strategy using what are commonly referred to as function blocks, where each function block is an object or other part (e.g., a subroutine) of an overall control routine and operates in conjunction with other function blocks (via communications called "links") to implement process control loops within process control environment 200. Control-based function blocks typically perform one of (1) an input function, such as that associated with a transmitter, a sensor or other process parameter measurement device; (2) a control function, such as that associated with a control routine that performs PID, fuzzy logic, etc. control; or (3) an output function which controls the operation of some device, such as a valve or conveyor motor, to perform some physical function within process control environment 200. Of course, hybrid and other types of function blocks exist. Function blocks may be stored in and executed by controllers 202-210, which is typically the case when these function blocks are used for, or are associated with, standard 4-20 mA devices and certain types of smart field devices (e.g., HART® devices), or may be stored in and implemented by the field devices themselves, which can be the case with FOUNDATION® Fieldbus devices. The one or more control modules in each of controllers 202-210 may implement one or more control loops that are performed by executing one or more of the function blocks.

In the unsecured portion of process control environment 200 are one or more operator workstations 240 that are communicatively connected to backbone 232. Via operator workstation(s) 240, human operators may monitor run-time operations of the process control environment 200, as well as take diagnostic, corrective, maintenance, and/or other actions that may be required. At least some of operator workstations 240 may be located at various, physically protected areas in or near process control environment 200, e.g., in a back-end environment of a plant, and in some situations, at least some of operator workstations 240 may be remotely located (but nonetheless in communicative connection with process control environment 200). Operator workstation(s) 240 may be wired or wireless computing devices. Operator workstation(s) 240 may have external connectivity (e.g., to the Internet), and thus may be vulnerable to network intrusions/attacks.

Process control environment 200 is further illustrated in FIG. 5 as including one or more configuration applications 242A and one or more configuration databases 242B, each of which is also communicatively connected to backbone 232. Various instances of configuration application(s) 242A may execute on one or more computing devices (not shown in FIG. 5) to enable users to create or change process control modules and download these modules via the backbone 232 to controllers 202-210 and/or other process controllers, as well as enable users to create or change operator interfaces via which an operator is able to view data and change data settings within process control routines. Configuration database(s) 242B store(s) the configured modules and/or operator interfaces. Generally, configuration application(s) 242A and configuration database(s) 242B may be centralized and have a unitary logical appearance to process control environment 200 (although multiple instances of a configuration application 242A may execute simultaneously within process control environment 200), and configuration database(s) 242B may be stored in a single physical data storage device or across multiple data storage devices. Configuration application(s) 242A, configuration database(s) 242B, and user interfaces thereto (not shown in FIG. 5) collectively form a configuration or development system 242 for creating/configuring control and/or display modules. Typically, but not necessarily, the user interfaces for configuration system 242 are different than operator workstations 240, with the user interfaces for configuration system 242 instead being utilized by configuration and development engineers irrespective of whether process control environment 200 is operating in real-time, and with operator workstation(s) 240 being utilized by operators during real-time (or "run-time") operations of process control environment 200. Like operator workstation(s) 240, configuration system 242 may be subject to network intrusions/attacks.

The example process control environment 200 also includes one or more wireless access points 244 that communicate with other devices using other wireless protocols, such as IEEE 802.11-compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) or Bluetooth, and/or other wireless communication protocols. Typically, each of wireless access point(s) 244 allows handheld or other portable computing devices (e.g., laptops, smartphones, etc.) to communicate over a respective wireless process control communication network. For example, a portable computing device may be a mobile workstation or diagnostic test equipment that is utilized by an operator within process control environment 200 (e.g., an instance of one of the operator workstations 240).

As noted above, one or both of the secure subsystems 120 and 140 of FIGS. 3 and 4 may be incorporated in process control environment 200. For example, IPD 124 of FIG. 3 may be IPD 220 of FIG. 5, and controller 122 of FIG. 3 may be controller 202 of FIG. 5. Alternatively, or in addition, IPD 146 of FIG. 4 may be IPD 222 of FIG. 5, controller 142 of FIG. 4 may be controller 204 of FIG. 5, and logic solver 144 of FIG. 4 may be a logic solver (not shown in FIG. 5) that is communicatively connected to controller 204.

It is noted that FIG. 5 illustrates only a single possible embodiment of process control environment 200. In other embodiments, for example, process control environment 200 may include more or fewer controllers, IPDs, and/or switch devices (and/or controllers, IPDs, and/or switch devices that are connected in a different manner or at a different position than is shown in FIG. 5), and/or may include various different types of devices not shown in FIG. 5 or discussed above. To provide a single, more specific example, process control environment 200 may include only a single IPD, located on the backbone 232 side of switch device 230, rather than the three IPDs 220, 222, 224.

Figure 6:
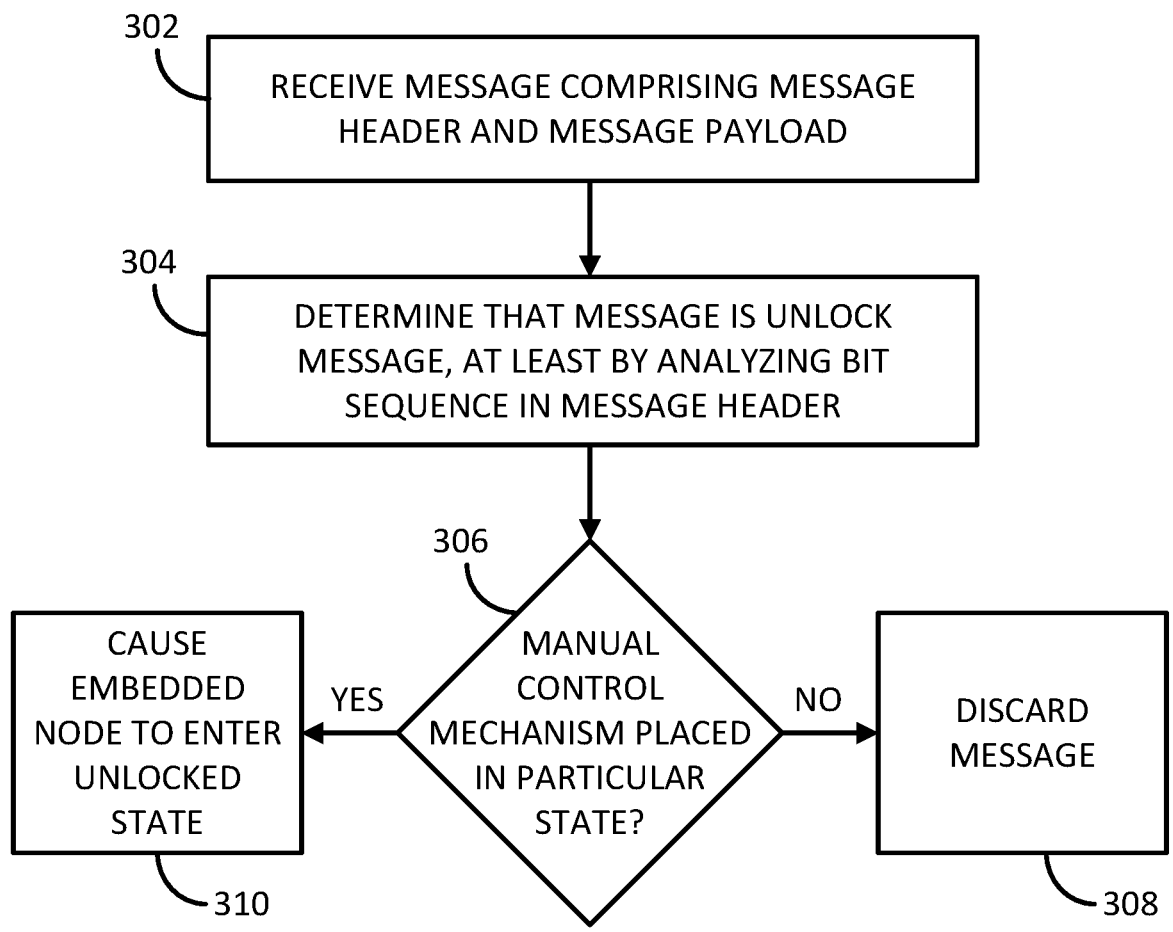
FIG. 6 is a flow diagram depicting an exemplary method for decreasing the risk of unauthorized access to an embedded node in a secure subsystem of a process control system.

FIG. 6 is a flow diagram depicting an exemplary method 300 for decreasing the risk of unauthorized access to an embedded node in a secure subsystem of a process control system. The method 300 may be implemented by an IPD such as IPD 124 of FIG. 3, IPD 146 of FIG. 4, or one of IPDs 220, 222, 224 of FIG. 5, for example. As a more specific example, the method 300 may be implemented by firewall 130 of FIG. 3.

At block 302 of the method 300, a message comprising a message header and a message payload is received via a communication network. The message may be or include an Ethernet frame having the embedded node as its destination, for example. In some embodiments and/or scenarios, the message payload is encrypted, while the message header is not encrypted. In other embodiments and/or scenarios, neither the message payload nor the message header is encrypted.

At block 304, it is determined, at least by analyzing a bit sequence of one or more bits in the message header, that the received message is an unlock message configured to access one or more protected functions of the embedded node. For example, block 304 may include comparing the bit sequence in the message header to a bit sequence that is known, a prior, to correspond to unlock messages. The embedded node may be a controller, a logic solver, or any other suitable type of node in a process control system that supports, or is associated with, one or more protected functions. The bit sequence in the message header may correspond to a particular header field, such as an Ethertype field of the message. That is, the bit sequence may be at a position, within the message header, that is defined by a standard/protocol as being (or being a part of) an Ethertype (or other header) field.

At block 306, it is determined whether a manual control mechanism (e.g., a button, toggle switch, a dial or rotating discs of a combination lock, etc.) has been placed in a particular state by a human operator (e.g., is currently being depressed, currently set to a particular code/combination, etc., or in some implementations, was recently depressed, etc.). The determination at block 306 may be made using any suitable sensor(s), analog-to-digital conversion circuitry, and so on.

If the control mechanism has not been placed in the particular state, flow proceeds to block 308, at which the message is discarded without being forwarded to the embedded node (and, in some implementations, without being forwarded to any other node or device). If the control mechanism has been placed in the particular state, however, flow proceeds to block 310, at which the embedded node is caused to enter an unlocked state. Block 310 may include forwarding the unlock message to the embedded node, for example, or forwarding the unlock message to a controller or other parent of the embedded node, etc. The "unlocked state" may be a state in which the embedded node permits a software upgrade, enters a diagnostic mode, can be decommissioned, allows certain inputs or changes to a live control routine, and so on.

In some embodiments where the embedded node is a child node of a controller (e.g., a logic solver), block 310 includes modifying, at the controller, the bit sequence in the message header to contain a value recognized by the child node and, after modifying the bit sequence in the message header, forwarding the message from the controller to the child node. If the bit sequence is in a position conventionally reserved for an Ethertype field, for example, the controller may modify the bit sequence such that the Ethertype field contains a conventional Ethertype value (and, in some implementations, such that the Ethertype field contains the Ethertype value that matches the communications protocol being used, such as IPv4, TRILL, etc.).

In some embodiments, if the message payload is encrypted, the controller also (and prior to forwarding the message to the child node) decrypts the message payload, and modifies another sequence of one or more bits in the decrypted message payload to a value that is recognized by the child node as an unlock message indicator. Thus, for example, the controller may cause the message to include a conventional unlock indicator.

Figure 7:
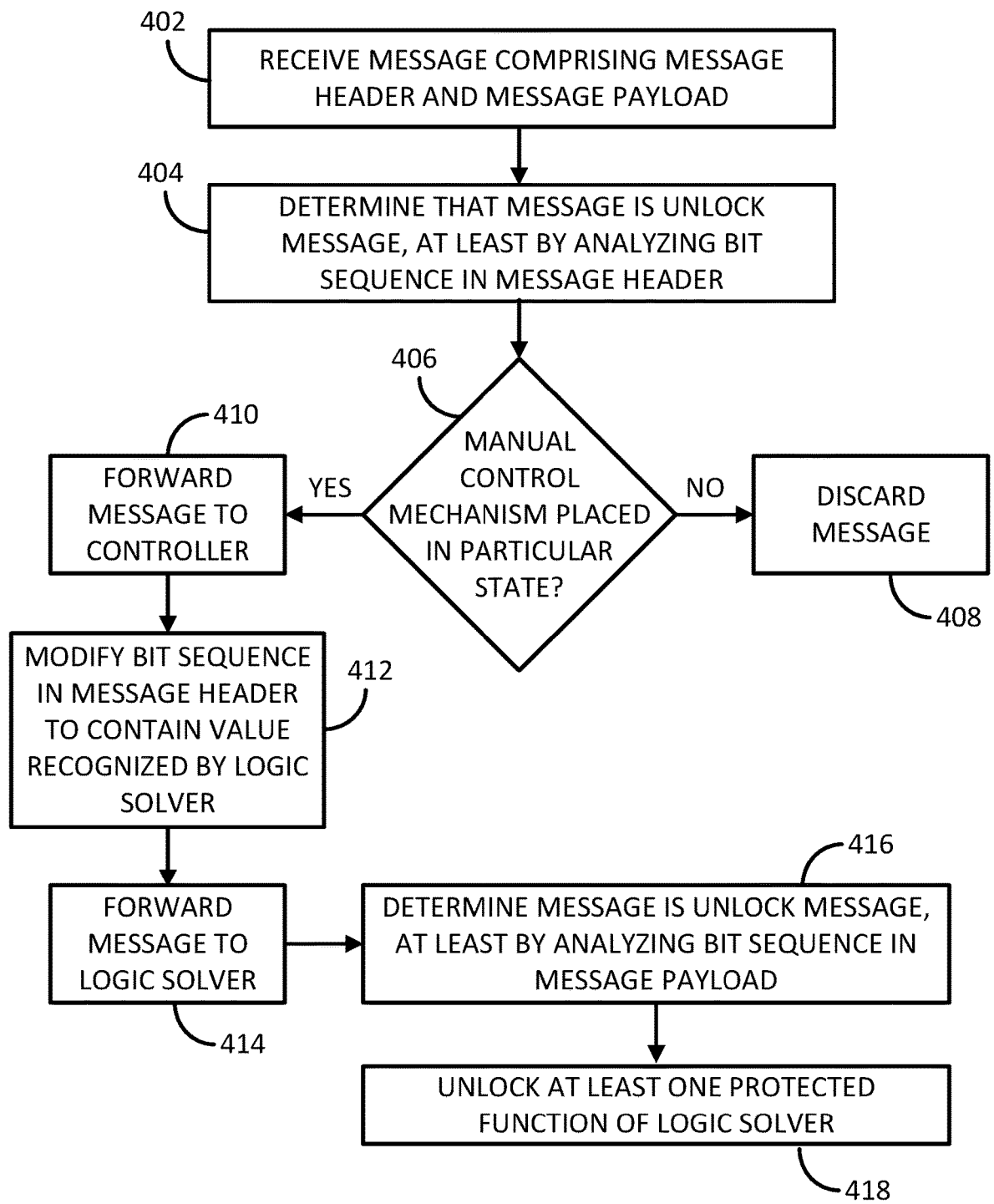
FIG. 7 is a flow diagram depicting another exemplary method for decreasing the risk of unauthorized access to an embedded node in a secure subsystem of a process control system.

FIG. 7 is a flow diagram depicting another exemplary method 400 for decreasing the risk of unauthorized access to an embedded node in a secure subsystem of a process control system. The method 400 may be implemented by various components of a secure subsystem of a process control system, such as IPD 146, controller 142, and logic solver 144 of secure subsystem 140 in FIG. 4, for example. As a more specific example, blocks 402, 404, 406, 408, and 410 may be implemented by an intrusion protection device such as IPD 146 of FIG. 4, blocks 412 and 414 may be implemented by a controller such as controller 142 of FIG. 4, and/or blocks 416 and 418 may be implemented by a logic solver such as logic solver 144 of FIG. 4.

At block 402 of the method 400, a message comprising a message header and a message payload is received via a communication network. Block 402 may be similar to block 302 of the method 300. For example, the message header may be unencrypted and the message payload may be encrypted, etc.

At block 404, it is determined that the received message is an unlock message, at least by analyzing a sequence of one or more bits in the message header. Block 404 may be similar to block 304 of the method 300. For example, the bit sequence may be positioned within an Ethertype field of the message header, etc.

At block 406, it is determined whether a manual control mechanism has been placed in a particular state by a human operator. Block 406 may be similar to block 306 of the method 300. If the control mechanism has not been placed in the particular state, flow proceeds to block 408, at which the message is discarded without being forwarded to the embedded node (and, in some implementations, without being forwarded to any other node or device). If the control mechanism has been placed in the particular state, however, flow proceeds to block 410, at which the message is forwarded to a controller.

At block 412, the bit sequence in the message header is modified, at the controller, to contain a value that is recognized by a logic solver that is a child node of the controller (e.g., a legacy logic solver, or a logic solver that is otherwise not programmed to interpret unlock indicators in the message header). If the bit sequence was included in an Ethertype field, for example, the Ethertype field may be set to a value that is defined by a communication standard/protocol being used in the process control system (and, in at least some embodiments, to a value that matches the protocol being used, such as IPv4, TRILL, etc.).

At block 414, the message, with the modified bit sequence in the message header, is forwarded from the controller to the logic solver. At block 416, it is determined, at the logic solver, that the message is an unlock message, at least by analyzing a sequence of one or more bits in the message payload. In some embodiments, the analyzed bit sequence in the message payload is a conventional unlock indicator, and thus recognizable by legacy logic solvers, or logic solvers that are otherwise not programmed to interpret unlock indicators in the message header. The analyzed bit sequence in the message header may have been present in the original message received at block 402 (i.e., if the message originally contained at least two unlock indicators), or may have been added by the IPD or the controller (e.g., by the controller after decrypting the message payload).

At block 418, at least one protected function of the logic solver is unlocked. For example, the logic solver may permit a software upgrade, enter a diagnostic mode, allow decommissioning, allow certain inputs or changes to a live control routine, and so on.

Embodiments of the techniques described in the present disclosure may include any number of the following aspects, either alone or combination:

Aspect 1. A method for decreasing the risk of unauthorized access to an embedded node in a secure subsystem of a process control system, the method comprising: receiving a message via a communication network, the message comprising a message header and a message payload; determining that the message is an unlock message configured to access one or more protected functions of the embedded node, wherein determining that the message is an unlock message includes analyzing a bit sequence of one or more bits in the message header; determining whether a manual control mechanism has been placed in a particular state by a human operator; and based upon (i) the determination that the message is an unlock message, and (ii) the determination of whether the manual control mechanism has been placed in the particular state, either causing or not causing the embedded node to enter an unlocked state.

Aspect 2. The method of aspect 1, wherein causing or not causing the embedded node to enter an unlocked state includes either: in response to determining (i) that the message is an unlock message, and (ii) that the manual control mechanism has been placed in the particular state, causing the embedded node to enter the unlocked state; or in response to determining (i) that the message is an unlock message, and (ii) that the manual control mechanism has not been placed in the particular state, not causing the embedded node to enter the unlocked state.

Aspect 3. The method of aspect 1 or 2, wherein: causing or not causing the embedded node to enter an unlocked state includes either (A) in response to determining (i) that the message is an unlock message, and (ii) that the manual control mechanism has been placed in the particular state, forwarding the unlock message to either the embedded node or a controller that is a parent of the embedded node, or (B) in response to determining (i) that the message is an unlock message, and (ii) that the manual control mechanism has not been placed in the particular state, dropping the unlock message without forwarding the unlock message.

Aspect 4. The method of any one of aspects 1 through 3, wherein receiving a message via a communication network includes receiving an encrypted message via the communication network, the encrypted message comprising an unencrypted message header and an encrypted message payload.

Aspect 5. The method of any one of aspects 1 through 4, wherein analyzing a bit sequence of one or more bits in the message header includes analyzing a bit sequence of one or more bits in an Ethertype field of the message header.

Aspect 6. The method of any one of aspects 1 through 5, wherein the embedded node is a controller.

Aspect 7. The method of any one of aspects 1 through 5, wherein: the embedded node is a child node of a controller; causing or not causing the embedded node to enter an unlocked state includes, in response to determining (i) that the message is an unlock message, and (ii) that the manual control mechanism has been placed in the particular state, causing the child node to enter the unlocked state; and causing the child node to enter the unlocked state includes (A) modifying, at the controller, the bit sequence in the message header to contain a value recognized by the child node, and (B) after modifying the bit sequence in the message header, forwarding the message from the controller to the child node.

Aspect 8. The method of any one of aspect 7, wherein: receiving a message via a communication network includes receiving an encrypted message via the communication network, the encrypted message comprising an unencrypted message header and an encrypted message payload; and causing the child node to enter the unlocked state further includes, prior to forwarding the message from the controller to the child node, (A) decrypting the encrypted message payload, and (B) modifying a bit sequence of one or more bits in the decrypted message payload to a value that is recognized by the child node as an unlock message indicator.

Aspect 9. The method of aspect 7 or 8, wherein: analyzing a bit sequence of one or more bits in the message header includes analyzing a bit sequence within an Ethertype field of the message header; and modifying the bit sequence in the message header to contain a value recognized by the child node includes modifying the Ethertype field to contain Ethertype information recognized by the child node.

Aspect 10. The method of any one of aspects 7 through 9, wherein the child node is a logic solver.

Aspect 11. The method of any one of aspects 1 through 10, wherein analyzing a bit sequence of one or more bits in the message header includes comparing the bit sequence in the message header to a bit sequence that is known to correspond to unlock messages.

Aspect 12. The method of any one of aspects 1 through 11, wherein determining whether a manual control mechanism has been placed in a particular state by a human operator includes determining whether a physical button is currently being pressed by a human operator.

Aspect 13. An intrusion protection device comprising: a manual control mechanism; and one or more processors configured to (A) receive a message via a communication network, the message comprising a message header and a message payload, (B) determine whether the message is an unlock message configured to access one or more protected functions of an embedded node of a process control system, at least by analyzing a bit sequence of one or more bits in the message header, (C) determine whether the manual control mechanism has been placed in a particular state by a human operator, and (D) when determining that the message is an unlock message, and that the manual control mechanism has been placed in the particular state, cause the embedded node to enter an unlocked state.

Aspect 14. The intrusion protection device of aspect 13, wherein the bit sequence in the message header is a bit sequence in an Ethertype field of the message header.

Aspect 15. The intrusion protection device of aspect 13 or 14, wherein the manual control mechanism is a physical button.

Aspect 16. The intrusion protection device of any one of aspects 13 through 15, wherein the one or more processors are configured to cause the embedded node to enter an unlocked state at least by: forwarding the unlock message to either the embedded node or a controller that is a parent of the embedded node.

Aspect 17. A secure subsystem of a process control system, the secure subsystem comprising: a controller including one or more controller processors configured to implement one or more process control modules; a logic solver including one or more logic solver processors configured to support a plurality of functions, wherein the plurality of functions includes one or more protected functions, and wherein the logic solver is coupled to the controller as a child node of the controller; and an intrusion protection device including a manual control mechanism, and one or more intrusion protection processors configured to (A) receive a message via a communication network, wherein the message comprises a message header and a message payload, (B) determine whether the message is an unlock message, at least by analyzing a bit sequence of one or more bits in the message header, (C) determine whether the manual control mechanism has been placed in a particular state by a human operator, and (D) when determining that the message is an unlock message, and that the manual control mechanism has been placed in the particular state, forward the message to the controller, wherein the one or more controller processors are further configured to, when the message is forwarded to the controller, (A) modify the bit sequence in the message header of the message to contain a value recognized by the logic solver, and (B) after modifying the bit sequence in the message header, forward the message to the logic solver, and wherein the one or more logic solver processors are configured to, when the message is forwarded to the logic solver, (A) determine whether the message is an unlock message, at least by analyzing a bit sequence of one or more bits in the message payload, and (B) when determining that the message is an unlock message, unlocking at least one of the one or more protected functions.

Aspect 18. The secure subsystem of aspect 17, wherein the message received via the communication network is an encrypted message comprising an unencrypted message header and an encrypted message payload.

Aspect 19. The secure subsystem of aspect 17 or 18, wherein the one or more controller processors are further configured to, when the message is forwarded to the controller: decrypt the encrypted message payload; and modify the bit sequence in the decrypted message payload to contain a value recognized as an unlock message indicator by the logic solver.

Aspect 20. The secure process control subsystem of aspect 17 or 18, wherein the one or more controller processors are configured to forward the encrypted message to the logic solver without first decrypting any portion of the encrypted message.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for decreasing the risk of unauthorized access to an embedded node in a secure subsystem of a process control system, the method comprising:
   receiving a message from a source external to the secure subsystem and via a communication network, the message comprising an unencrypted message header and an encrypted message payload;
   determining, by one or more processors, that the message is an unlock message configured to access one or more protected functions of the embedded node based on a bit sequence of one or more bits in the unencrypted message header;
   determining, by the one or more processors, whether a manual control mechanism has been placed in a particular state by a human operator;
   based upon (i) the determination that the message is an unlock message, and (ii) the determination of whether the manual control mechanism has been placed in the particular state, determining either to cause or not to cause, by the one or more processors, the embedded node to enter an unlocked state;
   in response to determining to cause the embedded node to enter an unlocked state, changing, by the one or more processors, at least a bit of the bit sequence in the unencrypted message header of the message from a first value indicating that the message is an unlock message to a protocol-defined value of a header field; and
   forwarding, by the one or more processors, the changed message to the embedded node, causing the embedded node to enter the unlocked state.

2. The method of claim 1, wherein causing or not causing the embedded node to enter an unlocked state includes either:
   in response to determining (i) that the message is an unlock message, and (ii) that the manual control mechanism has been placed in the particular state, causing the embedded node to enter the unlocked state; or
   in response to determining (i) that the message is an unlock message, and (ii) that the manual control mechanism has not been placed in the particular state, not causing the embedded node to enter the unlocked state.

3. The method of claim 1, wherein causing or not causing the embedded node to enter an unlocked state includes either:
   in response to determining (i) that the message is an unlock message, and (ii) that the manual control mechanism has been placed in the particular state, forwarding the unlock message to either the embedded node or a controller that is a parent of the embedded node; or
   in response to determining (i) that the message is an unlock message, and (ii) that the manual control mechanism has not been placed in the particular state, dropping the unlock message without forwarding the unlock message.

4. The method of claim 1, wherein determining that the message is an unlock message based on a bit sequence of one or more bits in the unencrypted message header includes determining that the message is an unlock message based on a bit sequence of one or more bits in an Ethertype field of the unencrypted message header.

5. The method of claim 1, wherein the embedded node is a controller.

6. The method of claim 1, wherein:
   the embedded node is a child node of a controller;
   causing or not causing the embedded node to enter an unlocked state includes, in response to determining (i) that the message is an unlock message, and (ii) that the manual control mechanism has been placed in the particular state, causing the child node to enter the unlocked state; and
   causing the child node to enter the unlocked state includes
      modifying, at the controller, the bit sequence in the unencrypted message header to contain a value recognized by the child node, and
      after modifying the bit sequence in the unencrypted message header, forwarding the message from the controller to the child node.

7. The method of claim 1, wherein determining that the message is an unlock message based on a bit sequence of one or more bits in the unencrypted message header includes comparing the bit sequence in the unencrypted message header to a bit sequence that is known to correspond to unlock messages.

8. The method of claim 1, wherein determining whether a manual control mechanism has been placed in a particular state by a human operator includes determining whether a physical button is currently being pressed by a human operator.

9. The method of claim 6, wherein:
   causing the child node to enter the unlocked state further includes, prior to forwarding the message from the controller to the child node,
      decrypting the encrypted message payload, and modifying a bit sequence of one or more bits in the decrypted message payload to a value that is recognized by the child node as an unlock message indicator.

10. The method of claim 6, wherein:
wherein determining that the message is an unlock message based on a bit sequence of one or more bits in the unencrypted message header includes determining that the message is an unlock message based on a bit sequence within an Ethertype field of the unencrypted message header; and
modifying the bit sequence in the unencrypted message header to contain a value recognized by the child node includes modifying the Ethertype field to contain Ethertype information recognized by the child node.

11. The method of claim 6, wherein the child node is a logic solver.

12. An intrusion protection device comprising:
a manual control mechanism; and
one or more processors configured to:
receive a message from a source external to a secure subsystem of a process control system and via a communication network, the message comprising an unencrypted message header and an encrypted message payload,
determine whether the message is an unlock message configured to access one or more protected functions of an embedded node in the secure subsystem based on a bit sequence of one or more bits in the unencrypted message header,
determine whether the manual control mechanism has been placed in a particular state by a human operator,
when determining that the message is an unlock message, and that the manual control mechanism has been placed in the particular state,
(i) determine to cause the embedded node to enter an unlocked state,
(ii) change at least a bit of the bit sequence in the unencrypted message header of the message from a first value indicating that the message is an unlock message to a protocol-defined value of a header field, and
(iii) forward the changed message to the embedded node, causing the embedded node to enter the unlocked state.

13. The intrusion protection device of claim 12, wherein the bit sequence in the encrypted message header is a bit sequence in an Ethertype field of the encrypted message header.

14. The intrusion protection device of claim 12, wherein the manual control mechanism is a physical button.

15. The intrusion protection device of claim 12, wherein the one or more processors are configured to cause the embedded node to enter an unlocked state at least by:
forwarding the unlock message to either the embedded node or a controller that is a parent of the embedded node.

16. A secure subsystem of a process control system, the secure subsystem comprising:
a controller including one or more controller processors configured to implement one or more process control modules;
a logic solver including one or more logic solver processors configured to support a plurality of functions, wherein the plurality of functions includes one or more protected functions, and wherein the logic solver is coupled to the controller as a child node of the controller; and
an intrusion protection device including
a manual control mechanism, and
one or more intrusion protection processors configured to:
receive a message from a source external to the secure subsystem and via a communication network, wherein the message comprises an unencrypted message header and an encrypted message payload,
determine whether the message is an unlock message, based on a bit sequence of one or more bits in the unencrypted message header,
determine whether the manual control mechanism has been placed in a particular state by a human operator, and
when determining that the message is an unlock message, and that the manual control mechanism has been placed in the particular state, forward the message to the controller,
wherein the one or more controller processors are further configured to, when the message is forwarded to the controller,
change at least a bit of the bit sequence in the unencrypted message header of the message from a first value indicating that the message is an unlock message to a protocol-defined value of a header field that is recognized by the logic solver, and
after changing at least the bit of the bit sequence in the unencrypted message header, forward the message to the logic solver, and
wherein the one or more logic solver processors are configured to, when the message is forwarded to the logic solver,
determine whether the message is an unlock message based on a bit sequence of one or more bits in either the encrypted message payload or a decrypted message payload, and
when determining that the message is an unlock message, unlocking at least one of the one or more protected functions.

17. The secure subsystem of claim 16, wherein the one or more controller processors are further configured to, when the message is forwarded to the controller:
decrypt the encrypted message payload to generate the decrypted message payload; and
modify the bit sequence in the decrypted message payload to contain a value recognized as an unlock message indicator by the logic solver.

18. The secure process control subsystem of claim 16, wherein the one or more controller processors are configured to forward the message to the logic solver without first decrypting any portion of the message.

* * * * *